No. 836,228. PATENTED NOV. 20, 1906.
A. W. WEIBLE.
VOTING MACHINE.
APPLICATION FILED MAR. 27, 1902.
5 SHEETS—SHEET 1.
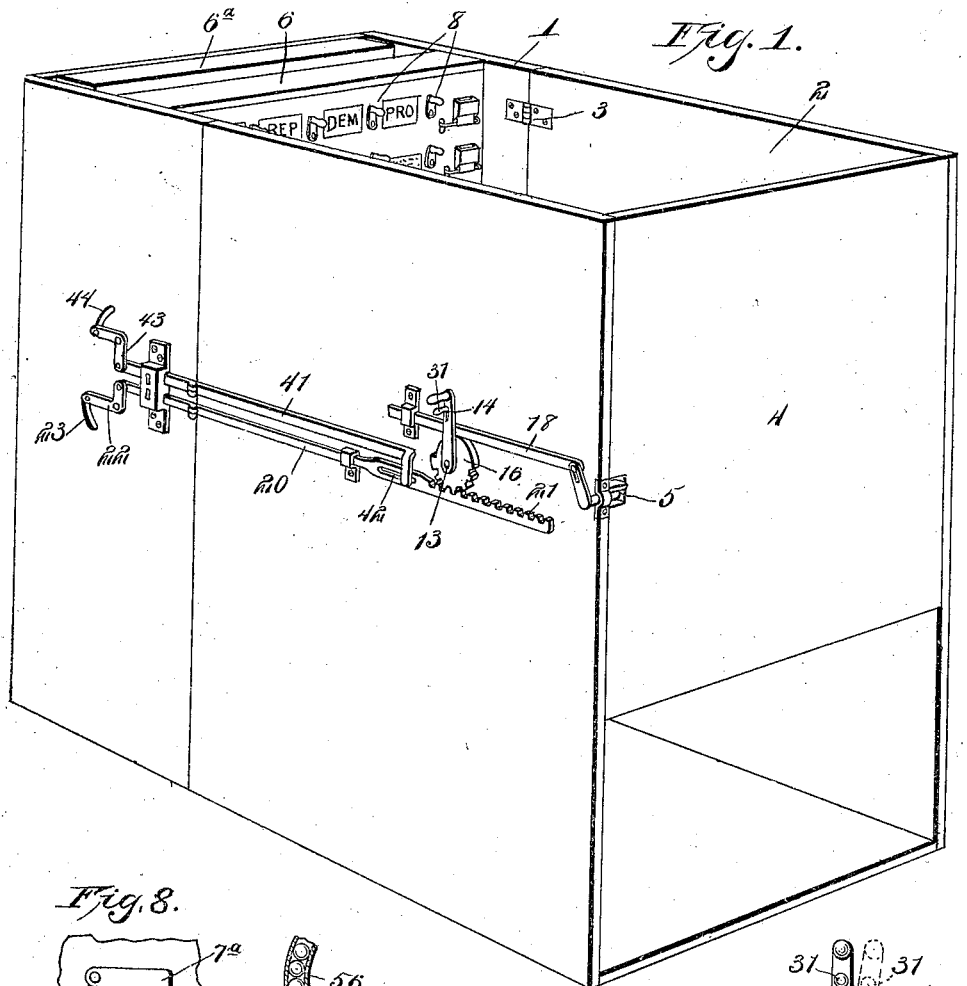
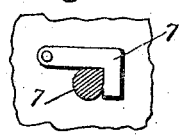
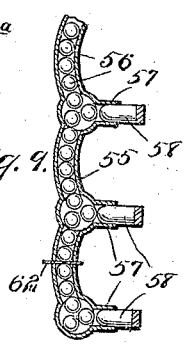
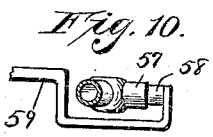
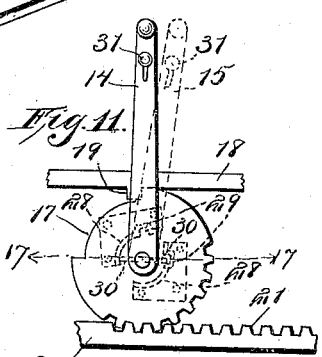
Witnesses:
Louis D. Heinrichs
L. H. Morrison
Inventor
Albert W. Weible
by W. Preston Williamson
Atty No. 836,228.
PATENTED NOV. 20, 1906.
A. W. WEIBLE.
VOTING MACHINE.
APPLICATION FILED MAR. 27, 1902.

5 SHEETS—SHEET 2.

No. 836,228. PATENTED NOV. 20, 1906.
A. W. WEIBLE.
VOTING MACHINE.
APPLICATION FILED MAR. 27, 1902.
5 SHEETS—SHEET 3.
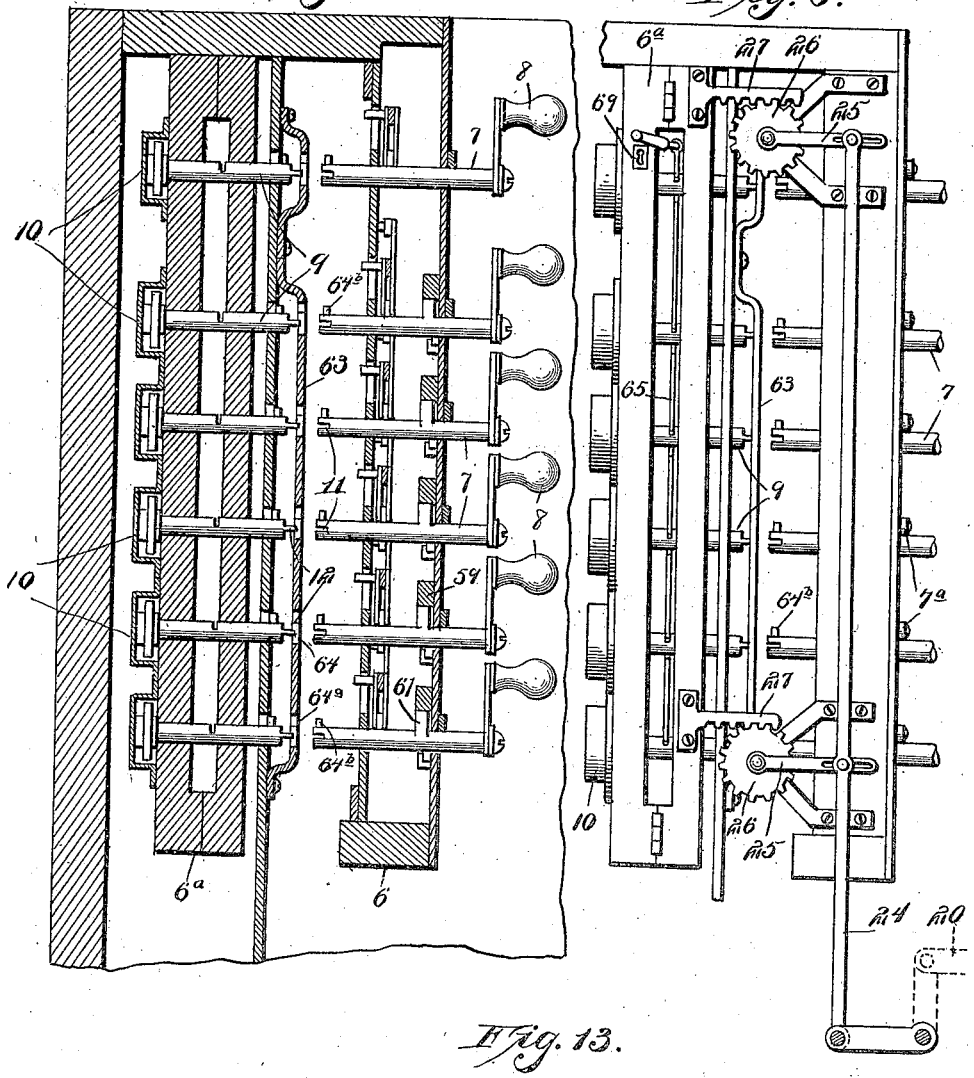
Witnesses:
Louis D. Heinrichs
L. H. Morrison
Inventor
Albert W. Weible
by W. Preston Williamson
Atty No. 836,228. PATENTED NOV. 20, 1906.
A. W. WEIBLE.
VOTING MACHINE.
APPLICATION FILED MAR. 27, 1902.

5 SHEETS—SHEET 4.

Witnesses:
Louis D. Heinrichs
L. A. Morrison

Inventor
Albert W. Weible
by W. Preston Williamson
Atty

No. 836,228. PATENTED NOV. 20, 1906.
A. W. WEIBLE.
VOTING MACHINE.
APPLICATION FILED MAR. 27, 1902.
5 SHEETS—SHEET 5.
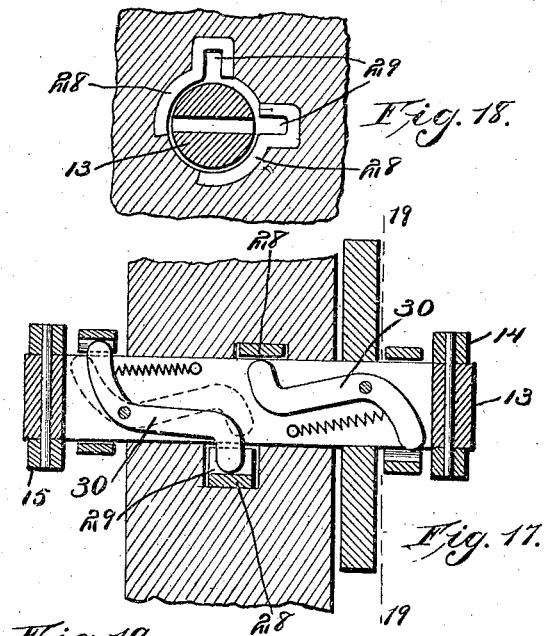
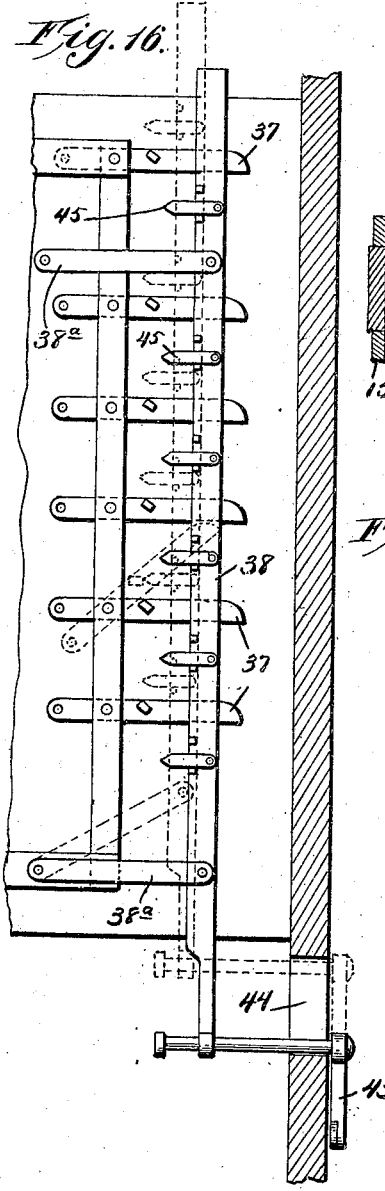
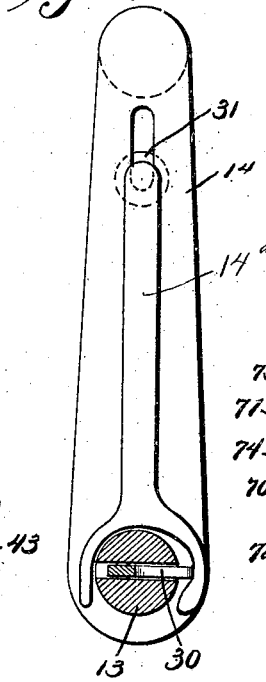
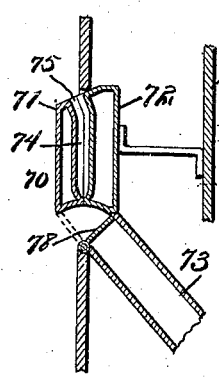
Witnesses
Louis D. Heinrichs
L. H. Morrison
Inventor
Albert W. Weible
By his Attorney

UNITED STATES PATENT OFFICE.

ALBERT W. WEIBLE, OF JAMESTOWN, NEW YORK.

VOTING-MACHINE.

No. 836,228.     Specification of Letters Patent.     Patented Nov. 20, 1906.

Application filed March 27, 1902. Serial No. 100,299.

*To all whom it may concern:*

Be it known that I, ALBERT W. WEIBLE, a citizen of the United States, residing at Jamestown, county of Chautauqua, and State of New York, have invented a certain new and useful Improvement in Voting-Machines, of which the following is a specification.

My invention relates to a new and useful improvement in voting-machines, and has for its object to provide a machine which will correctly register all votes cast with it, either straight or split tickets or tickets of independent candidates, and no more than one candidate of one party can be voted for at any one time, and after the last vote is cast after an election the machine can be locked, so that it cannot be tampered with until it is opened to count the votes or set for the next election.

It also requires a representative of each party represented in the election to open the machine.

The machine is also made to form its own booth for the privacy of each individual voting and can be folded up into a compact form for storage.

Another object of my invention is to provide an attachment whereby two candidates for the same office can be voted for where the law allows the same to be done.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 2:
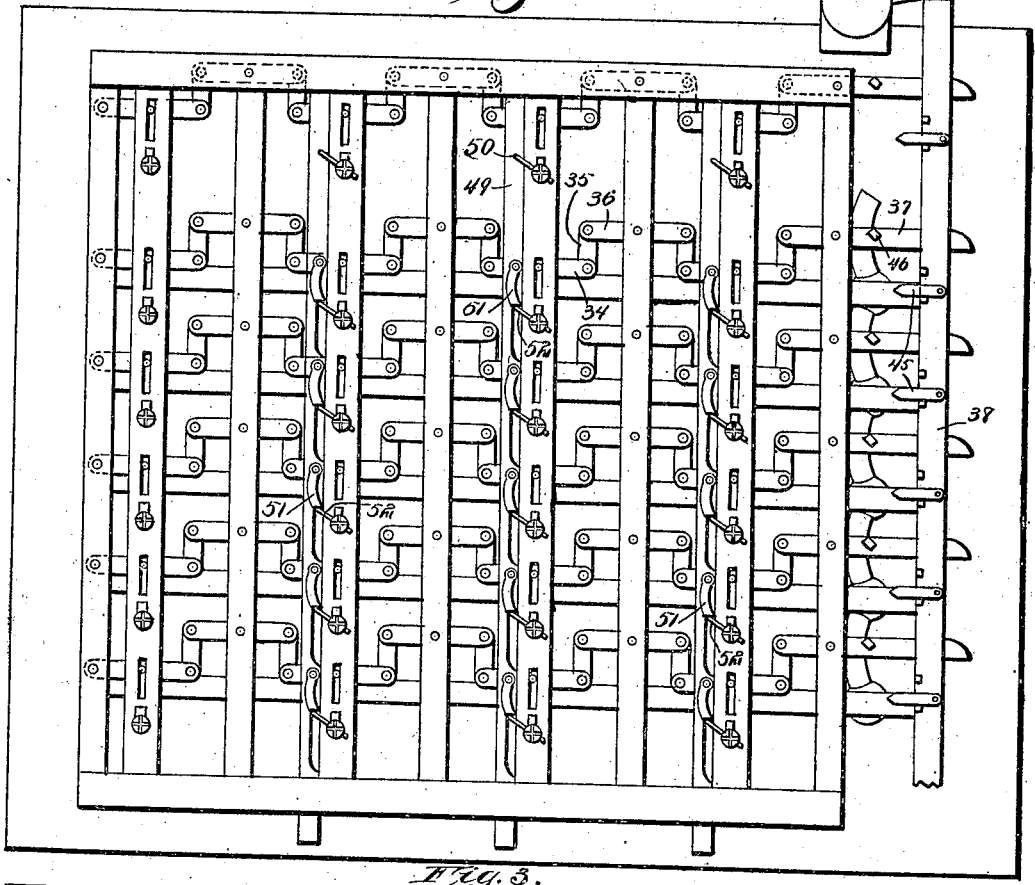
Figure 3:
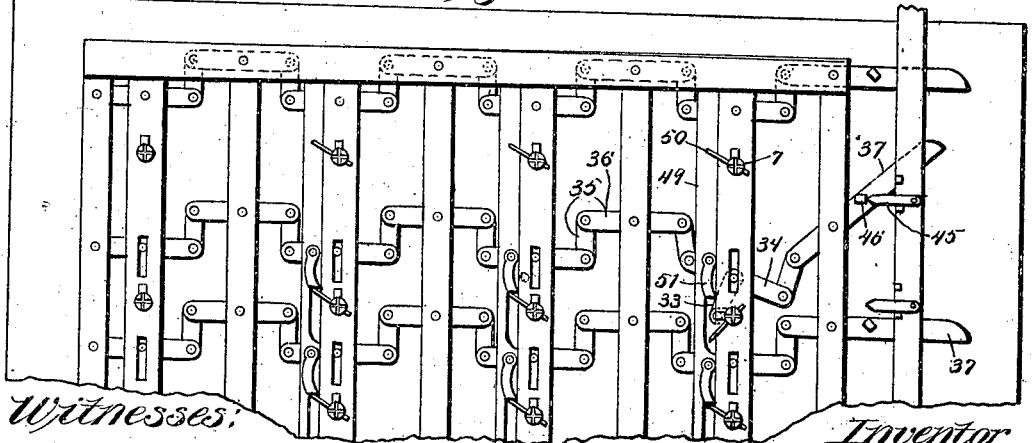
Figure 6:
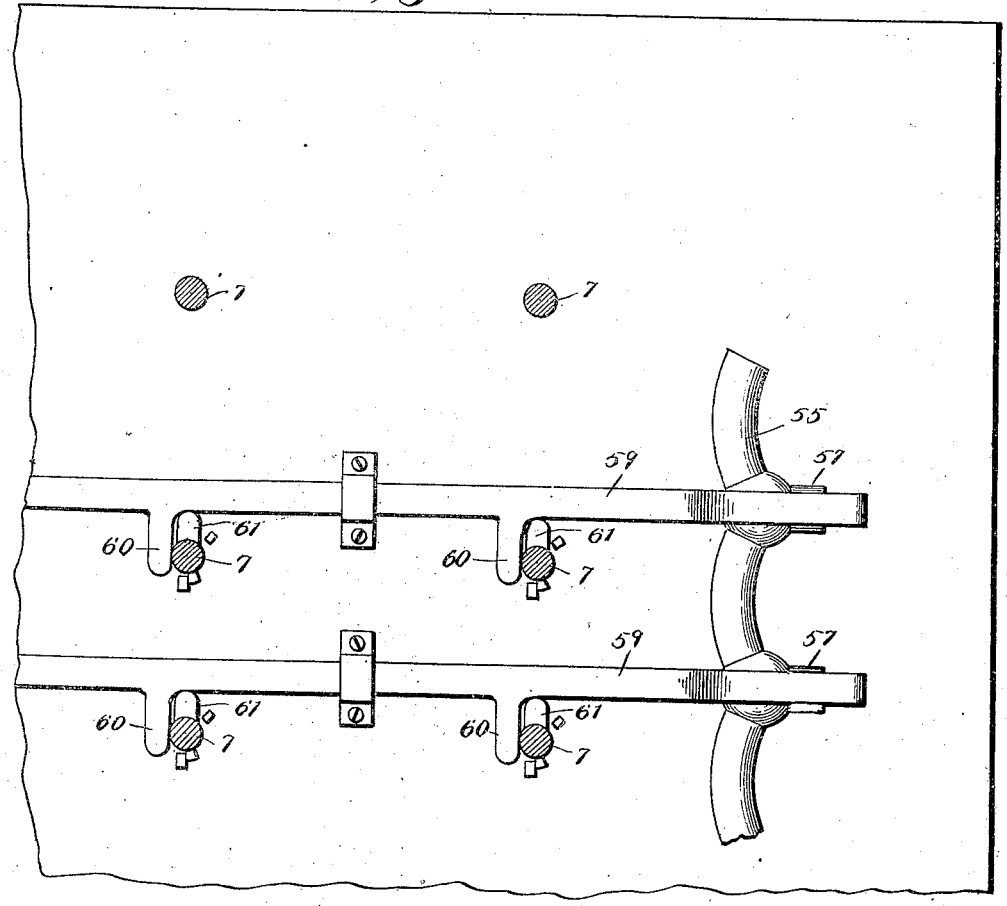
Figures 7, 15:
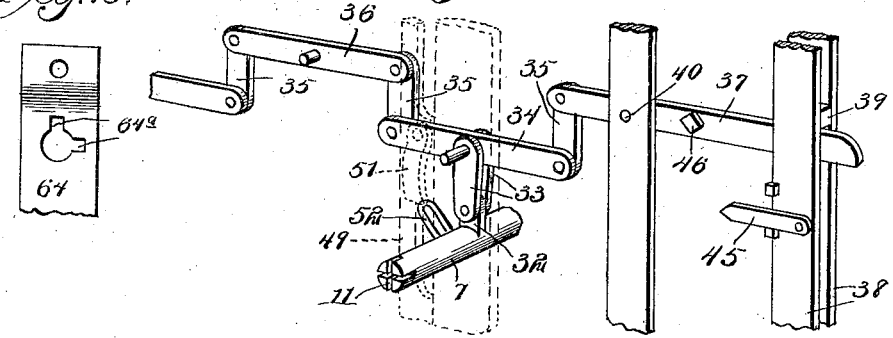

Figure 1 represents a perspective view of my voting-machine set up ready for use; Fig. 2, an elevation of the system of levers with the front board and cranks removed, showing the interior; Fig. 3, a similar view of a portion of Fig. 2, showing one crank turned; Fig. 4, a vertical section through the voting-machine; Fig. 5, a side view of the voting mechanism, showing the cranks broken off; Fig. 6, a detail view showing the mechanism by which two candidates are voted for at the same time; Fig. 7, a perspective view of a portion of a system of levers, showing the details of the same. Fig. 8 is a detail sectional view showing the manner of locking the spindles independently; Fig. 9, a vertical section through a portion of the tube in which the balls are located; Fig. 10, a cross-section of the same; Fig. 11, a detail view of the double-acting lock for locking and unlocking the door of the booth; Fig. 12, a perspective view showing the manner of locking the counting mechanism; Fig. 13, a front elevation of one of the chutes in which independent pockets are deposited; Fig. 14, a vertical section through one of the chutes in which independent pockets are deposited; Fig. 15, a front elevation of a portion of one of the strips through which the spindles are adapted to pass for the purpose of causing the spindles to be either exactly horizontal or perpendicular when the two sections of the machine are moved toward or away from one another. Fig. 16 is an elevation similar to Fig. 2, showing one side of the system of levers. Fig. 17 is a cross-section taken on the line 17 17 of Fig. 11. Fig. 18 is a vertical section taken through the center of the shaft in Fig. 17, showing the locking-segments. Fig. 19 is a vertical section taken on the line 19 19 of Fig. 17.

In the drawings, 1 represents the casing, in which all the voting mechanism is located. In the front of the voting mechanism a booth 2 is arranged, the sides of which are hinged to the casing 1 at the point 3, so that the booth may be folded against the voting mechanism for the purpose of storing the machine when not in use. The forward end of the booth has the door 4, hinged to one of the sides 2 and adapted to be locked to the other side by the lock 5.

The voting mechanism within the casing 1 is composed of two sections 6 and 6$^a$. The front section 6, which carries the actuating mechanism, is stationary; but the rear section 6$^a$, which carries the registering mechanism, is movable backward and forward. In the front section 6 are journaled a series of spindles 7. These spindles are arranged in rows horizontally and in columns vertically. The columns represent different tickets, such as Republican and Democratic, and the rows horizontally represent the candidates for the same office, but of different parties. The outer end of each of the spindles is provided with a crank 8, and when it is desired to vote a certain ticket or for a certain candidate the crank representing that ticket or candidate is turned down, so as to give the spindle one quarter-revolution, and this will register the vote, as will be hereinafter described. The rear section 6ª has also journaled therein a series of spindles 9. These spindles correspond to the number of spindles in the front section and lying in a line directly behind the same. The rear ends of the spindles 9 are connected with the registering devices 10, which may be of any ordinary construction, for registering consecutively the number of times the spindles 9 are turned one-quarter of a revolution. The rear ends of the spindles 7 are provided with notches or slots 11, and the forward ends of the spindles 9 are provided with the tongues 12, which are adapted to register with and pass into the slots 11 when the rear section 7 is brought forward, thus bringing the two spindles 7 and 9 in connection with one another, so that if the spindles 7 are turned so will be the spindles 9.

In one side of the booth is journaled a short shaft 13, which extends through the side of the booth and has secured upon each end hand-levers 14 and 15, the hand-lever 14 being upon the outside and the lever 15 upon the inside of the booth. The shaft 13 has secured to it upon the outside of the booth the segmental gear 16. The smooth portion of this segmental gear is provided with a cut-away portion 17. 18 is a bar which rests upon the segmental gear, and this bar has a tooth or projection 19, which extends downward and lies within the cut-away portion 17. The forward end of the bar 18 is connected to the lock 5, and this lock is a double-acting lock, so that the door may be unlocked either when the bar 18 is pushed forward or pulled rearward, it being a spring-lock, so as to lock whenever the door is closed. Underneath the segmental gear is a bar 20, which has the rack-teeth 21 formed upon the upper surface of its forward end, and these rack-teeth mesh with the teeth of the segmental gear, the rearward end of the bar being connected to one member of the bell-crank lever 22. The other member of the lever carries a pin which passes through a slot 23 in the casing 1 and is connected upon the interior of the casing with a vertical rod 24. This vertical rod is connected to the levers 25, which levers are secured to gear-wheels 26, journaled to a bracket extending outward from the section 6 of the voting mechanism. These gear-wheels 26 are in mesh with racks 27, which racks are secured to the movable rear section 6ª of the voting mechanism. Now it will be seen that when a voter desires to enter the booth the lever 14 is pulled forward, which will turn the shaft 13 and the segmental gear 16, so as to push the rod 20 rearward. This will, through the bell-crank lever 22, pull the rod 24 downward, which will turn the gears 26, which gears in turn will act upon the racks 27, so as to pull the section 6ª forward, which will bring the tongues 12 upon the spindles 9 within the notches or slots 11 on the spindles 7, so as to connect the two sets of spindles, and at the same time one end of the cut-away portion 17 of the segmental gear 16 will strike the tooth or projection 19 upon the slide-bar 18, so as to push the same forward, which will unlock the door, so that it may be opened and the voter enter the booth. The door swinging to behind him will lock automatically by a spring-catch. The mechanism is then in readiness for voting.

For the purpose of preventing another person from entering the booth while the same is occupied I provide upon the interior two segmental portions 28, each of which is provided with a notch 29, and the shaft 13 carries spring-latches 30, one of which works in conjunction with one of the segments 28 and the other with the remaining segments. Each of the levers 14 is provided with a small knob 31, connected to the upper end of the rod 14ª, which rod extends downward to the latches. The knobs when pulled upward will release the spring-latch 30, which may be in one of the notches 29. This is accomplished by means of a cam-surface on the lower ends of each of the rods 14ª coming in contact with the heel end of the latches when the rods are pulled upward. One of the rods is adapted to operate one latch and the other the remaining latch, and this locking mechanism is so arranged that when the lever 14 is pulled downward one of the spring-latches will spring into one of the notches 29, which will lock both of the levers and can be unlocked by pulling upon the knob 31 of the inside lever. Thus no other person can enter the booth while the same is occupied.

I will now describe the voting mechanism. Each of the spindles 7 has formed with or secured to it the lugs 32, and these lugs are pivoted to one end of the short links 33, the upper end of said links being pivoted to the center of a lever 34. Each end of this lever 34 is pivoted to the short links 35, the other end of the links 35 being pivoted to the ends of the levers 36, which levers are pivoted in their center to the framework of the section 6. Thus all the spindles 7 lying in a horizontal line are connected by this system of levers, consisting of the levers 34 and 36, connected together by the links 35. The lever 34 upon one end of the system of levers is only connected to a link 35 upon one end of said lever, the other end of the lever being pivoted to the framework, the opposite end of the system of levers terminating with the lever 37, which corresponds to one of the levers 36, which is connected at its inner end to a link 35 and is pivoted to the framework at 40, and the other end of this lever 37 lies between the vertically-moving upright strips 38, and these strips are connected together by blocks 39, which when all the mechanism is in its normal position lie in contact with the upper surface of the levers 37. The strips 38 are connected to the stationary framework by means of links 38ª, so that when the strips 38 are raised upward they are also caused to move inward, and when the strips 38 are lowered they move not only downward, but away from the center of the machine.

It will be seen that if the blocks 39 rest upon the levers 37 none of the spindles 7 can be rotated, because of the fact that the end lever 34 upon one end of the system of levers is pivoted to the frame, and therefore both of the ends of the system of levers would be held stationary, which will prevent any of the levers 36 from being tilted upon their pivots, which would be necessary in rotating the spindles 7; but if the outer end of the levers 37 is free to rise then any of the spindles may be rotated. Therefore the strips 38, carrying the blocks 39, are raised as the voter enters the booth, thus putting the mechanism in an operative position. The raising of the strips 38 is accomplished at the same time as the door is unlocked and the rear section 6ª caused to travel forward, and also with the same mechanism, as follows: Upon the outside of the booth, just above the slide-bar 20, is provided a second slide-bar 41, the forward end of which carries a pin which passes through a slot 42, provided in the bar 20, and the rear end of the bar 41 is connected to one member of the bell-crank lever 43, the other member of the lever being connected, through the slot 44, with the strips 38. Thus as the bar 20 is pushed rearward the bar 41 will also be forced rearward and through the bell-crank lever raise the strips which carry the blocks 39, which will allow the levers 37 to raise when the spindles are turned.

When any of the spindles 7 are turned one-quarter of a revolution, the lever 34, to which it is connected by the link 33, will be tilted downward, which in turn will tilt all of the levers 34 and 36 to the right of the actuated spindle and raise the outer end of the lever 37 upward, as shown in Fig. 3; but all of the levers of one system to the left of the actuated spindle will remain stationary in their normal position, because of the fact that the end lever 34 is secured to the stationary frame. When the lever 37 is raised, it is held in its raised position by means of pivoted fingers 45, which are pivoted to the upright strips 38, and the levers 37 are provided with lugs 46, which when the strip 38 is raised, as before described, will strike the ends of the fingers and raise them slightly and by abutting against the ends of the fingers will prevent the lever 37 from resuming its normal position until the strip 38 is returned to its normal position.

By holding the end of the lever 37 upward the voter will be allowed to correct his vote or change from one candidate of one party to the candidate of the other party by simply turning down the crank representing the candidate for whom he wishes to vote, and this action will return the crank he previously turned down to its normal position. Thus he could turn down every crank in any horizontal row; but in the end only one crank would remain down, and the last crank would be the only one registered, as a counting mechanism would be turned back with the cranks. It can be easily seen by consulting Figs. 2 and 3 how this movement is accomplished, for if any of the levers 34 are pulled downward this action through the levers 36 and links 35 will pull upward upon any of the levers 34 which may have previously been pulled downward, and as these levers 34 are connected to the cranks upon the spindles these cranks will be raised to their vertical position, and thus turn back any spindles which have been previously turned down in that horizontal line. It will be understood that the system of levers is arranged in horizontal lines, and thus the spindles in the same horizontal line with the one turned down are the only ones affected.

The top horizontal row of cranks is used for voting the straight tickets—that is, by turning down one of the top cranks every candidate in that vertical row will be voted for, and this is accomplished by means of the vertical bar 49, which is connected to the upper spindle 7 by means of the small crank-pin 50. Thus when the spindle is turned the vertical bar 49 will be forced downward by the action of the crank-pin 50. This vertical bar has arranged opposite each of the other spindles pawls 51, which are pivoted to the bar 49, and when these pawls are forced downward with the bar they are adapted to engage lugs or projections 52, extending outward from the spindles 7, and thus turn the spindles one-quarter of a revolution the same as if each crank had been turned alternately. After one straight ticket has been voted for if another crank representing a straight ticket be turned down all of the other cranks previously turned down would be returned to their normal position. This is accomplished by means of the system of levers connected to the upper row of spindles turning back the straight-ticket spindle previously turned down, and in turning back this straight-ticket spindle the bar 49 is raised and the pawls 51 raised out of contact with the lugs 52, and as the straight-spindle ticket is turned down in the other vertical line the bar 49, which is connected by the crank-arm 50 with that spindle, is pressed downward, and all of the pawls 51 upon that bar act to turn down all of the spindles in that vertical line, thus noting another straight ticket, and as each of the spindles below the straight-ticket spindle are turned down they will actuate their particular horizontal system of levers, which will act, as before described, to turn back each of the spindles previously turned down by the previously-actuated straight-ticket spindle. It will thus be seen that no matter how many cranks are turned down or in what order they are turned down only one spindle in each horizontal row will remain turned down at the end, and turning down one spindle will turn back any other spindle previously turned down in the same horizontal row through the horizontal line of levers, as before described, or if after turning down a straight-ticket crank the voter desired to vote for a single candidate of another party by turning down the crank representing that single candidate he would return the straight-ticket crank to its normal position and also the crank representing the candidate of that party for the same office as he was voting for; but all the other cranks would remain turned down which had been accomplished by the turning down of the straight-ticket crank. This operation is accomplished through the following means: When the single crank of any ticket is turned down, this crank will actuate its particular horizontal line of levers, so as to turn back the crank in the same horizontal line of the straight ticket voted, and this crank in turning back will bring the lug 52 in contact with the pawl 51 on the bar 49 and press upward upon said bar, thus turning back the straight-ticket spindle and at the same time showing that an entirely straight ticket has not been voted. All of the other spindles of the straight ticket will remain turned down; but it will be seen that no matter how many cranks the voter turns down his vote will only be registered once for each candidate, and the last crank turned down will represent the candidate he was voting for, and all of the others previously turned down will be returned to their normal position, and it is impossible to vote for more than one candidate or more than once for the same candidate.

After the voter has voted and desires to leave the booth he pulls the handle 15 toward him, at the same time releasing the spring-catch 30, and in so doing he will first act upon the bar 20, so as to cause the section 6ª of the voting mechanism to recede and disengage the spindles 9 from the spindles 7, and then upon a continued movement of the bar 20 the bar 41 will be actuated, which will pull the vertical strips 38 downward, and the blocks 39 will engage the upper surface of the levers 37, which will press the outer ends of such levers downward, and thus return the whole system of levers and all of the cranks to their normal position, and at the same time the bar 18 will be reciprocated so as to unlock the door and allow the voter to pass out.

For the purpose of registering the total number of voters voting in each booth I provide a registering mechanism 53, having an arm 54 lying above the upper end of the vertical strips 38, so that each time the vertical strips are raised by a voter entering the booth the arm 54 will be actuated so as to register the same.

It sometimes occurs that there are four candidates for an office and two to be elected, such as in the case of representatives, and I have made provision for such voting by providing upon one side of the mechanism the tube 55. This tube is adapted to contain balls 56, and opposite each horizontal row of levers a small tube 57 branches out from the main tube, and in this small tube is fitted, so as to slide, the plungers 58, and at the point where the branch tube 57 joins the main tube 55 an enlargement is formed which when all the mechanism is in its normal position will allow one of the balls to lie outside of the line of the rest of the balls in the tube, so that if there is nothing to prevent when the plunger is pressed inward it will press this outside ball in between two other balls of the main line, and so lengthen the line that distance, the end of the plunger 57 being rounded and taking the place of the displaced ball; but as soon as the plunger is withdrawn a ball will fall out of the line, and so shorten the main line, as before. When it is desired to vote in groups—say, for instance, there are four candidates in each party for the same office and two to be elected—the spindles in these four horizontal rows are disengaged from the straight-ticket bars 49 by throwing the pawl 51 out of engagement with the projection 52, and then the horizontal bars 59 are passed across the machine, so as to lie a distance above the spindles, as shown in Fig. 6, and one end of these horizontal bars is connected to the plunger 58, as shown in Fig. 10. Each of the bars has depending lugs 60, one for each spindle, and the spindles 7 have lugs 61, adapted to engage the lugs 60, so that when the spindles are turned the lugs 61 will press against the lugs 60 and slide the bar 59, and thereby cause the plunger 58 connected to such bar to be pressed inward and press one ball into the main line. Then another crank may be turned in the same column, or another column, but in a different horizontal row, and this will press another ball in the main line, and no other candidate can then be voted for for that office unless one of the cranks is turned back, because of the fact that two balls have been previously taken from the tube 55, so that it only leaves room for two balls to be added to the main line, and when it is tried to turn another crank another ball cannot be pressed in the main line, because the columns of balls will be stopped at the top. They will be stopped by either the top of the tube being closed or a slide 62 passes between the balls at any given point. Thus by removing a certain number of balls any combination can be formed—as, for instance, three out of the four candidates could be voted for by removing three balls or one by removing one ball—the system of levers would operate to return the cranks the same as before described.

For the purpose of causing all the spindles to be perpendicular or horizontal when the two sections 6 and 6ª are moved toward or away from one another I provide upon the partition between the sections strips 63, which strips are provided with holes 64 in register with the spindles, and these holes have vertical and horizontal notches 64ª, as shown in Fig. 15, leading out from the same, and the spindles 7, which are adapted to protrude through the openings 64 when the section 6ª is brought forward is provided with a lug 64ᵇ, so that unless the cranks are either perpendicular or horizontal the spindles 7 cannot pass through the openings 64, because if the cranks are in their horizontal or vertical position the lug 64ᵇ would then not register with either of the notches 64ª.

After the polls have closed the spindles 9 are locked against further manipulation by means of a vertical rod 65, running from the top to the bottom of the machine, as shown in Figs. 5 and 12, and this rod is bent so as to form the shoulder 66, and the spindles 9 are cut away or slanted, so as to form flat surfaces 67, and the upper end of the rod is connected to a crank 68 for raising and lowering the vertical rod 65. When the rod 65 is raised, the spindles 9 are free to revolve; but when they are lowered the shoulder 66 will come in contact with the flat surfaces 67 of each of the spindles and prevent said spindles from being turned, a lock 69 being provided so that the crank 68 may be locked with a key and only unlocked by an authorized person.

In Fig. 16 I have illustrated a manner for locking the spindles independently, which consists in forming the spindles with two flattened surfaces at right angles to one another and in providing a right-angle pivoted hook 7ª, which when engaging the spindle, as shown in Fig. 16, will prevent the same from being moved.

For the purpose of allowing the voting for independent candidates or candidates not mentioned in the regular tickets I provide upon one side of the machine a vertical row of pockets 70, one opposite each horizontal row of cranks or one for each different office. These pockets are composed of two sections, the front section 71 being secured to the stationary section 6 of the machine and the rear section 72 being secured to the movable section 6ª. At the rear underneath the pockets are arranged chutes 73, also secured to the stationary section 6. Between the two sections 71 and 72 is formed a pocket proper, 74, and when the two sections are together the pocket 74 will be closed at the bottom.

Tickets are provided of the proper size and proper thickness upon which to write the name of the party to be voted for, and these tickets will pass through the slot 75 and into the pockets 74, and any other ticket cannot be inserted. For each pocket 70 is provided a spindle 76, which is in connection with a system of levers which connect all the other spindles of that particular horizontal line; but these spindles 76 instead of actuating a registering mechanism is connected by a crank to a horizontal shaft 77, which is adapted to be rocked when the spindle is turned. To the shaft 77 is secured a flap 78, which when in its normal position will be as shown in Fig. 14, closing the outer end of the chute 73; but if the ticket has been inserted in the pocket the spindle 76 is then turned one-quarter of a revolution, which will throw the flap outward in the position shown in dotted lines in Fig. 14. Then when the voter leaves the booth and the rear section 6ª is caused to travel rearward the section 72 will travel with it, which will separate the two sections 71 and 72 and allow the ticket to fall into the chute 73 and from there in a receptacle provided for the same upon the interior of the machine. If, however, the voter after inserting his ticket in a pocket and turning the spindle 76 desires to vote for another candidate at the same time, whenever he turns down another crank in the same horizontal line the spindle 76 will be returned to its normal position through the system of levers and that will throw the flap 78 back into its normal position, as shown in full lines in Fig. 14, and then when the sections 71 and 72 are separated the ticket will fall out upon the floor outside of the booth, and therefore will not be deposited upon the interior of the machine.

The advantage of my invention is that it is impossible to so manipulate the machine that two candidates for the same office can be voted for by the same voter or any one candidate cannot be voted for more than once by one voter and also at the same time allows for the voting of candidates in groups or the voting for independent candidates and also providing all these preventives against illegal voting. It at the same time allows the voter to change his mind as often as he pleases while in the booth, and no matter for whom he has voted by turning down another crank he can correct his vote at any time.

Of course I do not wish to be limited to the exact construction here shown, as numerous modifications as to the details of construction could be made without departing from the spirit of my invention.

Having thus fully described my invention, what I claim as new and useful is—

1. In a voting-machine, a face-plate, a series of spindles journaled in the face-plate in horizontal and vertical lines, cranks secured to the outer end of the spindles, movable registering mechanism for each spindle, a voting-booth surrounding the machine, a door through which the voter enters the booth, a double-acting lock for locking the door, means for moving the registering mechanism into clutch with the spindles when the lock is unlocked from the outside to allow the voter to enter the booth, and means for moving the mechanism out of clutch with the spindles when the door is unlocked from the inside to allow the voter to leave the booth, a series of lever systems arranged in horizontal lines adapted to be actuated by the turning of the spindles whereby when any spindle is turned down another spindle in the same horizontal line will be returned to its normal position, an independent horizontal upper line of spindles, mechanism whereby when any one of the upper line of spindles is rotated the spindles in the vertical line beneath said spindle will also be rotated if not previously disconnected, and means for disconnecting any of the spindles in the vertical line so as not to be operated by the top spindle, and means for returning all of the spindles to their normal position by the unlocking of the door for the next voter to enter, substantially as and for the purpose specified.

2. In a voting-machine, a face-plate, a series of spindles journaled in said face-plate in horizontal and vertical lines, cranks secured to the outer end of said spindles, movable registering mechanism for registering the votes, a folding booth surrounding the voting-machine, a door through which the voter enters and leaves the booth, a double-acting lock for locking the door, said lock so constructed that when locked from the inside cannot be unlocked from the outside, and vice versa, mechanism whereby the registering mechanism is brought into clutch with the spindles when the door is unlocked from the outside, and thrown out of clutch with the spindles when the door is unlocked from the inside, a series of lever systems arranged in horizontal lines and adapted to be actuated by the turning of the spindles, whereby by the turning down of any spindle another spindle in the same horizontal line previously turned down will be returned to its normal position, an independent horizontal upper line of spindles, mechanism whereby the turning down of any one of the upper horizontal line of spindles will turn all of the spindles in a direct line underneath said spindle, except the ones previously disconnected from this mechanism, and means for disconnecting any one of the spindles in the vertical line to prevent them from being actuated by the upper spindle, mechanism whereby the spindles are returned to their normal position when the door of the booth is unlocked from the outside, means for locking the registering mechanism after the polls have been closed, means for locking any one of the spindles independently against turning, and means for preventing the registering mechanism from being thrown in or out of clutch with the spindles unless the cranks are in a vertical or horizontal position, substantially as and for the purpose specified.

3. In a voting-machine, supporting means formed in two sections, one of said sections being stationary and the other movable, spindles extending through the stationary member and adapted to operate mechanism carried by the movable member, lugs on the ends of the spindles, and a plate secured to the movable members, said plate having apertures through which the spindles pass, said apertures having notches for the passage of the lugs on the spindles when said spindles are in a certain position.

4. In a voting-machine, supporting means formed in two sections, one of said sections being stationary and the other movable, registering mechanism and indicating devices upon said sections, respectively racks on the movable sections, gear-wheels on the stationary section meshing with the racks and means for rotating the gear-wheels.

5. In a voting mechanism, a frame, a plurality of spindles mounted in the frame, a register operated by each spindle, connections between the spindles, one end of the connections being held stationary by the frame, and the opposite end free and means engaging the free ends of the connections for holding the spindle against movement.

6. In a voting-machine, a plurality of spindles a register for each of the spindles, a series of levers so positioned with relation to the spindles and connected thereto that when the levers are in one position, the spindles are free to move but when in a second position the levers hold the spindles against movement and means for holding the levers in the varying positions.

In testimony whereof I have hereunto affixed my signature in the presence of two subscribing witnesses.

ALBERT W. WEIBLE.

Witnesses:
FRANK E. SESSIONS,
ROTHWELL BUTTERFIELD.